(12) United States Patent
Noble

(10) Patent No.: US 8,107,822 B2
(45) Date of Patent: Jan. 31, 2012

(54) PROTOCOLS FOR OUT-OF-BAND COMMUNICATION

(75) Inventor: Gayle L. Noble, Boulder Creek, UT (US)

(73) Assignee: Finisar Corporation, Sunnyvale, CA (US)

( * ) Notice: Subject to any disclaimer, the term of this patent is extended or adjusted under 35 U.S.C. 154(b) by 667 days.

(21) Appl. No.: 12/198,631

(22) Filed: Aug. 26, 2008

(65) Prior Publication Data

US 2009/0116846 A1 May 7, 2009

Related U.S. Application Data

(63) Continuation-in-part of application No. 11/134,786, filed on May 20, 2005, now abandoned, and a continuation-in-part of application No. 11/204,920, filed on Aug. 15, 2005, now abandoned, and a continuation-in-part of application No. 11/344,883, filed on Feb. 1, 2006, and a continuation-in-part of application No. 11/348,745, filed on Feb. 7, 2006, now abandoned, and a continuation-in-part of application No. 11/279,360, filed on Apr. 11, 2006, now abandoned, and a continuation-in-part of application No. 11/413,829, filed on Apr. 28, 2006, now Pat. No. 7,899,057, and a continuation-in-part of application No. 11/537,602, filed on Sep. 29, 2006, now abandoned, and a continuation-in-part of application No. 11/537,590, filed on Sep. 29, 2006, now abandoned, and a continuation-in-part of application No. 11/537,599, filed on Sep. 29, 2006, now abandoned, and a continuation-in-part of application No. 11/537,595, filed on Sep. 29, 2006, now abandoned, and a continuation-in-part of application No. 11/685,548, filed on Mar. 13, 2007, now abandoned, and a continuation-in-part of application No. 11/685,551, filed on Mar. 13, 2007, now abandoned, and a continuation-in-part of application No. 11/744,591, filed on May 4, 2007.

(51) Int. Cl.
*H04B 10/00* (2006.01)
(52) U.S. Cl. ........................................................ 398/135
(58) Field of Classification Search .................... 398/22, 398/128, 135
See application file for complete search history.

(56) References Cited

U.S. PATENT DOCUMENTS

| 4,340,932 A | 7/1982 | Bakula et al. |
| 4,468,728 A | 8/1984 | Wang |
| 4,611,272 A | 9/1986 | Lomet |

(Continued)

FOREIGN PATENT DOCUMENTS

WO 2004097576 11/2004

(Continued)

OTHER PUBLICATIONS

U.S. Appl. No. 11/344,883, Mail Date Mar. 10, 2010, Office Action.

(Continued)

*Primary Examiner* — Shi K Li
(74) *Attorney, Agent, or Firm* — Maschoff Gilmore & Israelsen

(57) ABSTRACT

Methods for managing an optical network through out-of-band communication between optical transceiver modules in a heterogeneous network fabric are disclosed. The disclosed methods include methods for performing fabric discovery, communicating error messages, detecting intrusion. Methods are also disclosed for communicating between transceivers of differing protocol versions and memory capacity.

15 Claims, 9 Drawing Sheets

U.S. PATENT DOCUMENTS

| | | |
|---|---|---|
| 4,775,956 A | 10/1988 | Kaji et al. |
| 4,866,701 A | 9/1989 | Giacopelli et al. |
| 4,879,630 A | 11/1989 | Boucard et al. |
| 4,891,803 A | 1/1990 | Huang et al. |
| 5,390,359 A | 2/1995 | Damerau |
| 5,416,769 A | 5/1995 | Karol |
| 5,459,731 A | 10/1995 | Brief |
| 5,461,614 A | 10/1995 | Lindholm |
| 5,500,858 A | 3/1996 | McKeown |
| 5,625,371 A | 4/1997 | Miller et al. |
| 5,659,680 A | 8/1997 | Cunningham et al. |
| 5,724,509 A | 3/1998 | Starkweather et al. |
| 5,786,921 A | 7/1998 | Wang et al. |
| 5,793,871 A | 8/1998 | Jackson |
| 5,841,982 A | 11/1998 | Brouwer et al. |
| 5,847,708 A | 12/1998 | Wolff |
| 5,850,388 A | 12/1998 | Anderson et al. |
| 5,884,072 A | 3/1999 | Rasmussen |
| 5,978,947 A | 11/1999 | Kim et al. |
| 6,115,680 A | 9/2000 | Coffee et al. |
| 6,163,681 A | 12/2000 | Wright et al. |
| 6,246,684 B1 | 6/2001 | Chapman et al. |
| 6,266,789 B1 | 7/2001 | Bucher et al. |
| 6,298,047 B1 | 10/2001 | Steffes et al. |
| 6,393,341 B1 | 5/2002 | Lawrence et al. |
| 6,393,587 B2 | 5/2002 | Bucher et al. |
| 6,467,053 B1 | 10/2002 | Connolly et al. |
| 6,473,794 B1 | 10/2002 | Guheen et al. |
| 6,480,313 B1 | 11/2002 | Kawamura |
| 6,484,249 B2 * | 11/2002 | Hirai et al. .................... 711/209 |
| 6,507,923 B1 | 1/2003 | Wall et al. |
| 6,618,368 B1 | 9/2003 | Tanigawa et al. |
| 6,662,009 B2 | 12/2003 | Lynn |
| 6,674,724 B1 | 1/2004 | Main et al. |
| 6,678,275 B1 | 1/2004 | DeGrandpre et al. |
| 6,686,759 B1 | 2/2004 | Swamy |
| 6,691,165 B1 | 2/2004 | Bruck et al. |
| 6,697,379 B1 | 2/2004 | Jacquet et al. |
| 6,714,217 B2 | 3/2004 | Huang et al. |
| 6,714,233 B2 | 3/2004 | Chihara et al. |
| 6,738,645 B2 | 5/2004 | Knight |
| 6,745,011 B1 | 6/2004 | Hendrickson et al. |
| 6,754,488 B1 | 6/2004 | Won et al. |
| 6,791,956 B1 | 9/2004 | Leu |
| 6,801,756 B1 | 10/2004 | Agrawal et al. |
| 6,801,949 B1 | 10/2004 | Bruck et al. |
| 6,839,321 B1 | 1/2005 | Chiruvolu |
| 6,842,429 B1 | 1/2005 | Shridhar et al. |
| 6,850,483 B1 | 2/2005 | Semaan |
| 6,853,620 B2 | 2/2005 | Mauritz et al. |
| 6,880,070 B2 | 4/2005 | Gentieu et al. |
| 6,910,149 B2 | 6/2005 | Perloff et al. |
| 6,931,574 B1 | 8/2005 | Coupal et al. |
| 6,934,477 B2 | 8/2005 | Willebrand |
| 6,941,482 B2 | 9/2005 | Strong |
| 6,954,789 B2 | 10/2005 | Dietz et al. |
| 6,970,917 B1 | 11/2005 | Kushwaha et al. |
| 6,996,418 B2 | 2/2006 | Teo et al. |
| 7,003,080 B1 | 2/2006 | Doskow et al. |
| 7,007,208 B1 | 2/2006 | Hibbert et al. |
| 7,027,808 B2 | 4/2006 | Wesby |
| 7,050,505 B2 | 5/2006 | Kaku |
| 7,062,264 B2 | 6/2006 | Ko et al. |
| 7,100,092 B2 | 8/2006 | Allred et al. |
| 7,110,954 B2 | 9/2006 | Yung et al. |
| 7,120,149 B2 | 10/2006 | Salamat |
| 7,181,663 B2 | 2/2007 | Hildebrandt |
| 7,194,503 B2 | 3/2007 | Shell et al. |
| 7,206,972 B2 | 4/2007 | Wilson et al. |
| 7,222,359 B2 | 5/2007 | Freund et al. |
| 7,224,968 B2 | 5/2007 | Dobson et al. |
| 7,257,741 B1 | 8/2007 | Palenik et al. |
| 7,283,816 B2 | 10/2007 | Fok et al. |
| 7,284,272 B2 | 10/2007 | Howard et al. |
| 7,286,510 B2 | 10/2007 | Wang et al. |
| 7,286,515 B2 | 10/2007 | Olson et al. |
| 7,286,647 B2 | 10/2007 | Stormon et al. |
| 7,313,113 B1 | 12/2007 | Hills et al. |
| 7,330,662 B2 | 2/2008 | Zimmerman |
| 7,343,524 B2 | 3/2008 | Klotz et al. |
| 7,349,692 B2 | 3/2008 | Ko et al. |
| 7,352,706 B2 | 4/2008 | Klotz et al. |
| 7,372,848 B2 | 5/2008 | Doerr et al. |
| 7,380,154 B2 | 5/2008 | Gale et al. |
| 7,457,312 B2 | 11/2008 | Weiss et al. |
| 7,483,974 B2 | 1/2009 | Goud et al. |
| 7,522,904 B1 | 4/2009 | Zhu |
| 7,523,198 B2 | 4/2009 | Wu et al. |
| 7,526,322 B2 | 4/2009 | Whistler |
| 7,545,740 B2 | 6/2009 | Zelig et al. |
| 7,551,922 B2 | 6/2009 | Roskowski et al. |
| 2001/0016925 A1 | 8/2001 | Bucher |
| 2001/0049263 A1 | 12/2001 | Zhang |
| 2002/0025795 A1 | 2/2002 | Sharon et al. |
| 2002/0044662 A1 | 4/2002 | Sowler |
| 2002/0055999 A1 | 5/2002 | Takeda |
| 2002/0068600 A1 | 6/2002 | Chihara et al. |
| 2002/0078178 A1 | 6/2002 | Senoh |
| 2002/0112041 A1 | 8/2002 | Viscount et al. |
| 2002/0122050 A1 | 9/2002 | Sandberg |
| 2002/0161875 A1 | 10/2002 | Raymond |
| 2002/0181405 A1 | 12/2002 | Ying |
| 2002/0181506 A1 | 12/2002 | Loguinov |
| 2003/0038769 A1 | 2/2003 | Turpin et al. |
| 2003/0048854 A1 | 3/2003 | Kaku |
| 2003/0157895 A1 | 8/2003 | Agrawal et al. |
| 2003/0167405 A1 | 9/2003 | Freund et al. |
| 2003/0204781 A1 | 10/2003 | Peebles et al. |
| 2003/0220112 A1 | 11/2003 | Bugeja |
| 2003/0226034 A1 | 12/2003 | Howard et al. |
| 2004/0006633 A1 | 1/2004 | Chandra et al. |
| 2004/0015317 A1 | 1/2004 | Klotz et al. |
| 2004/0054680 A1 | 3/2004 | Kelley et al. |
| 2004/0057389 A1 | 3/2004 | Klotz et al. |
| 2004/0076194 A1 | 4/2004 | Okamoto et al. |
| 2004/0100963 A1 | 5/2004 | Guo |
| 2004/0107391 A1 | 6/2004 | Bauman |
| 2004/0133733 A1 | 7/2004 | Bean et al. |
| 2004/0153267 A1 | 8/2004 | Fishman et al. |
| 2004/0177344 A1 | 9/2004 | Kuo |
| 2004/0185876 A1 | 9/2004 | Groenendaal et al. |
| 2004/0199568 A1 | 10/2004 | Lund |
| 2004/0203379 A1 | 10/2004 | Witkowski et al. |
| 2004/0225916 A1 | 11/2004 | Clark |
| 2004/0242197 A1 | 12/2004 | Fontaine |
| 2004/0255191 A1 | 12/2004 | Fox et al. |
| 2004/0264448 A1 | 12/2004 | Wise et al. |
| 2005/0013300 A1 | 1/2005 | Akahane et al. |
| 2005/0034055 A1 | 2/2005 | Rangan et al. |
| 2005/0050190 A1 | 3/2005 | Dube |
| 2005/0060402 A1 | 3/2005 | Oyadomari et al. |
| 2005/0060403 A1 | 3/2005 | Bernstein et al. |
| 2005/0078606 A1 | 4/2005 | Bernstein et al. |
| 2005/0078692 A1 | 4/2005 | Gregson |
| 2005/0085259 A1 | 4/2005 | Conner et al. |
| 2005/0114083 A1 | 5/2005 | Bullis |
| 2005/0120269 A1 | 6/2005 | Larson |
| 2005/0166023 A1 | 7/2005 | Kasako et al. |
| 2005/0172161 A1 | 8/2005 | Cruz et al. |
| 2005/0185597 A1 | 8/2005 | Le et al. |
| 2005/0185658 A1 | 8/2005 | Kamiwada |
| 2005/0232284 A1 | 10/2005 | Karaoguz et al. |
| 2005/0232291 A1 | 10/2005 | Brown et al. |
| 2005/0249214 A1 | 11/2005 | Peng |
| 2005/0254488 A1 | 11/2005 | Huang |
| 2005/0257104 A1 | 11/2005 | Wood |
| 2005/0260982 A1 | 11/2005 | Ko et al. |
| 2006/0058982 A1 | 3/2006 | Yamada et al. |
| 2006/0095174 A1 | 5/2006 | Sonnenrein et al. |
| 2006/0101271 A1 | 5/2006 | Thomas |
| 2006/0117300 A1 | 6/2006 | Puthukattukaran et al. |
| 2006/0198312 A1 | 9/2006 | Schondelmayer et al. |
| 2006/0198318 A1 | 9/2006 | Schondelmayer et al. |
| 2006/0198319 A1 | 9/2006 | Schondelmayer et al. |
| 2006/0200708 A1 | 9/2006 | Gentieu et al. |
| 2006/0200711 A1 | 9/2006 | Schondelmayer et al. |
| 2006/0205398 A1 | 9/2006 | Seckendorf et al. |

| | | | |
|---|---|---|---|
| 2006/0230134 | A1 | 10/2006 | Qian et al. |
| 2006/0230312 | A1 | 10/2006 | Nichols et al. |
| 2006/0246845 | A1 | 11/2006 | Lawson et al. |
| 2006/0264178 | A1 | 11/2006 | Noble et al. |
| 2007/0086351 | A1 | 4/2007 | Noble et al. |
| 2007/0087741 | A1 | 4/2007 | Noble et al. |
| 2007/0087771 | A1 | 4/2007 | Noble et al. |
| 2007/0088981 | A1 | 4/2007 | Noble et al. |
| 2007/0099567 | A1 | 5/2007 | Chen et al. |
| 2007/0146782 | A1 | 6/2007 | Lehotsky et al. |
| 2007/0287450 | A1 | 12/2007 | Yang et al. |
| 2008/0008128 | A1 | 1/2008 | Nagarajan et al. |
| 2009/0254650 | A1 | 10/2009 | Sheppard |

FOREIGN PATENT DOCUMENTS

WO 2005/018162 A1 2/2005

OTHER PUBLICATIONS

U.S. Appl. No. 11/930,677, Mail Date Jun. 9, 2010, Office Action.
U.S. Appl. No. 10/218,343, filed Aug. 13, 2002, Farley et al.
U.S. Appl. No. 10/228,212, filed Aug. 26, 2002, Dubé et al.
U.S. Appl. No. 10/307,272, filed Nov. 27, 2002, Bain et al.
U.S. Appl. No. 10/424,361, filed Apr. 25, 2003, Foster et al.
U.S. Appl. No. 10/424,363, filed Apr. 25, 2003, Bain et al.
U.S. Appl. No. 10/424,364, filed Apr. 25, 2003, Bain et al.
U.S. Appl. No. 10/448,670, filed May 30, 2003, Cicchetti et al.
U.S. Appl. No. 10/448,827, filed May 30, 2003, Garcia et al.
U.S. Appl. No. 10/764,218, filed Jan. 23, 2004, Durham et al.
U.S. Appl. No. 11/344,829, filed Feb. 1, 2006, Lawson et al.
U.S. Appl. No. 11/344,883, filed Feb. 1, 2006, Schondelmayer et al.
U.S. Appl. No. 11/344,892, filed Feb. 1, 2006, Schondelmayer et al.
U.S. Appl. No. 11/344,893, filed Feb. 1, 2006, Schondelmayer et al.
U.S. Appl. No. 11/345,202, filed Feb. 1, 2006, Schondelmayer et al.
U.S. Appl. No. 11/537,590, filed Sep. 29, 2006, Noble et al.
U.S. Appl. No. 11/537,595, filed Sep. 29, 2006, Noble et al.
U.S. Appl. No. 11/537,599, filed Sep. 29, 2006, Noble et al.
U.S. Appl. No. 11/537,602, filed Sep. 29, 2006, Noble et al.
U.S. Appl. No. 11/930,677, filed Oct. 31, 2007, Noble et al.
U.S. Appl. No. 11/433,290, filed May 12, 2006, Foster.
P. Sharma et al., "Channel Models for Indoor Wireless Transmission," University of Massachusetts Lowell, Lowell, MA, 6 pages, Proceedings of International Conference on Third Generation Wireless and Beyond 2001.
O. Oteri and A. Paulraj, "Fading and Interference Mitigation in Multi-Antenna Wireless Transmission," Wireless Communications and Networking Conference, 2005 IEEE, Mar. 2005, 6 pages.
Finisar Xgig Analyzer User's Guide Fibre Channel, Gig-E; May 3, 2005, 164 pages.
Finisar NetWisdom 2.1 User's Guide; Jul. 2005, 316 pages.
Finisar NetWisdom 2.1 User's Guide, Sep. 2005, 316 pages.
"IEEE Standard Test Access Port and Boundary-Scan Architecture," Test Technology Standards Committee of the IEEE Computer Society, IEEE std 1149.1-2001 (2001).
IEEE Standard Test Access Port and Boundary-Scan Architecture, Test Technology Standards Committee of the IEEE Computer Society, IEEE Std 1149.1-1990 (1990).
Supplement to IEEE Std 1149.1-1990, IEEE Standard Test Access Port and Boundary-Scan Architecture test Technology Standards Committee of the IEEE Computer Society (1995).
"Mercury LoadRunner 8.0," Copyright 2005 CNET Networks, Inc., http://downloads.zdnet.co.uk/0,39025604,39092344s,00.htm.
Ezchip Announces the NP-1c, Its Second Generation 10-Gigabit Network Processor, http://www.ezchip.com/html/press_021021.html; Oct. 21, 2002; 4 pages.
TOPcore™ EZchip's Task Optimized Processing Core Technology; http://web.archive.org/web/20040204074648/http://www.ezchip.com/html/tech_r.html; Feb. 4, 2004; 4 pages.
NP-1c Network Processor 10-Gigabit 7-Layer Network Processor with Integrated Search Engines; http://www.ezchip.com/html/pr_np-1c.html; Date Downloaded Jul. 21, 2004; 5 pages.
NP-1c: 10-Gigabit 7-Layer Network Processor with Integrated Search Engines, Product Brief; http://www.ezchip.com/images/pdfs/EZchip_NP-1c_Brief_online.pdf; Date Downloaded: Jul. 20, 2004; Copyright 2003; 2 pages.
Performance Benchmarks; http://www.ezchip.com/html/pr_benchmarks.html; Jul. 28, 2004; 3 pages.
NP-1c Network Processor 10-Gigabit Network Processor with Integrated Search Engines; http://www.ezchip.com/html/pr_np-1c.html; Apr. 4, 2006; 5 pages.
Finisar Xgig Analyzer Blades Hardware Guide; Apr. 8, 2004; 22 pages.
Finisar Xgig Analyzer User's Guide Fibre Channel, Infiniband, Gig-E; Apr. 8, 2004; 124 pages.
NP-1c Programming Overview White Paper; Jul. 2004; 4 pages.
Frequently Asked Questions, The Wayback Machine; http://www.archive.org/about/faqs.php; Nov. 9, 2006; 48 pages.
Cisco—What Does the show ip ospf interface Command Reveal? Sep. 9, 2004; 7 pages.
Cisco—Preventing Duplicate EIGRP Router IDs; Oct. 14, 2004; 7 pages.
Cisco—Configuring IS-IS for IP on Cisco Routers; Aug. 1, 2005; 8 pages.
Cisco—Dial-on-demand Routing (DDR) with Easy IP and DHCP Server; Oct. 24, 2005; 11 pages.
Using OSPF Stub Router Advertisement Feature; http://www.cisco.com/warp/public/cc/pd/iosw/prodlit/osfn_tc.htm; Apr. 10, 2006; 6 pages.
Products & Solutions; http://www.ezchip.com/html/prod_r.html; Date Downloaded: Aug. 4, 2004; 2 pages.
NP-1 Family: The World's Most Highly Integrated 10-Gigabit 7-Layer Network Processors;http://web.archive.org/web/20030214201226/www.ezchip.com/html/pr_np-1.html; Date Downloaded: Jul. 28, 2004; 5 pages.
Internet Archive, Frequently Asked Questions; http://www.archive.org/about/faqs.php; Date Downloaded: Jul. 28, 2004; 34 pages.
In-Line Taps: Full Duplex Single or Multi-port Ethernet and Fibre Channel Taps; Date Downloaded: Aug. 3, 2004; 2 pages.
SAN QoS ProbeFC; Date Downloaded: Aug. 3, 2004; 2 pages.
Tech Notes: Using Single Port Taps with IDS Systems; Date Downloaded: Aug. 3, 2004; 1 page.
Eberle, H. et al.; "Testing Systems Wirelessly." VLSI Test Symposium, 2004, 22nd IEEE Proceedings, Apr. 25-29, 2004, pp. 335-340.
U.S. Appl. No. 11/134,786, Mail Date Jul. 23, 2008, Office Action.
U.S. Appl. No. 11/537,590, Mail Date Mar. 25, 2009, Office Action.
U.S. Appl. No. 11/204,920, Mail Date Mar. 18, 2008, Office Action.
U.S. Appl. No. 11/204,920, Mail Date Oct. 3, 2008, Office Action.
U.S. Appl. No. 11/279,360, Mail Date Mar. 19, 2008, Office Action.
U.S. Appl. No. 11/279,360, Mail Date Oct. 1, 2008, Office Action.
U.S. Appl. No. 11/348,745, Mail Date Sep. 8, 2008, Office Action.
U.S. Appl. No. 11/348,745, Mail Date Mar. 26, 2009, Office Action.
U.S. Appl. No. 11/348,745, Mail Date Apr. 24, 2009, Office Action.
U.S. Appl. No. 11/413,829, Nov. 19, 2008, Office Action.
U.S. Appl. No. 11/344,883, Dec. 24, 2008, Office Action.
U.S. Appl. No. 11/344,892, Jan. 27, 2009, Office Action.
U.S. Appl. No. 11/344,892, Jul. 18, 2008, Office Action.
U.S. Appl. No. 11/344,893, Jan. 5, 2009, Office Action.
U.S. Appl. No. 11/344,893, Jul. 22, 2008, Office Action.
U.S. Appl. No. 11/345,202, Jan. 27, 2009, Office Action.
U.S. Appl. No. 11/345,202, Jun. 26, 2008, Office Action.
U.S. Appl. No. 11/413,829, Office Action mailed Aug. 26, 2010.
U.S. Appl. No. 11/413,829, Notice of Allowance mailed Oct. 25, 2010.
U.S. Appl. No. 11/744,591, Office Action mailed Sep. 13, 2010.
U.S. Appl. No. 11/744,591, Office Action mailed Mar. 8, 2011.
U.S. Appl. No. 11/776,226, Office Action mailed Sep. 9, 2010.
U.S. Appl. No. 11/776,226, Office Action mailed Apr. 18, 2011.
U.S. Appl. No. 11/966,646, Restriction Requirement mailed Sep. 1, 2010.
U.S. Appl. No. 11/966,646, Office Action mailed Dec. 10, 2010.
U.S. Appl. No. 11/685,548, Office Action mailed Nov. 2, 2009.
United States Patent and Trademark Office, U.S. Appl. No. 11/344,892, Office Action mailed Aug. 18, 2009.
United States Patent and Trademark Office, U.S. Appl. No. 11/344,883, Office Action mailed Oct. 2, 2009.
United States Patent and Trademark Office, U.S. Appl. No. 11/685,548, Office Action mailed Nov. 2, 2009.

United States Patent and Trademark Office, U.S. Appl. No. 11/348,745, Office Action mailed Aug. 3, 2009.
United States Patent and Trademark Office, U.S. Appl. No. 11/776,226, Office Action mailed Aug. 13, 2009.
United States Patent and Trademark Office, U.S. Appl. No. 11/776,226, Amendment and Response filed Jan. 13, 2010.
United States Patent and Trademark Office, U.S. Appl. No. 11/776,226, Office Action mailed Mar. 9, 2010.
United States Patent and Trademark Office, U.S. Appl. No. 11/776,226, Amendment and Response filed Jul. 9, 2010.
United States Patent and Trademark Office, U.S. Appl. No. 11/685,551, Office Action mailed Nov. 3, 2009.
United States Patent and Trademark Office, U.S. Appl. No. 11/537,590, Notice of Allowance mailed Aug. 28, 2009.
United States Patent and Trademark Office, U.S. Appl. No. 11/344,893, Office Action mailed Jul. 20, 2009.
United States Patent and Trademark Office, U.S. Appl. No. 11/204,920, Office Action mailed Jun. 9, 2009.
United States Patent and Trademark Office, U.S. Appl. No. 11/134,786, Office Action mailed May 12, 2009.
United States Patent and Trademark Office, U.S. Appl. No. 11/134,786, Amendment and Response to Office Action filed Nov. 12, 2009.
United States Patent and Trademark Office, U.S. Appl. No. 11/134,786, Office Action mailed Dec. 4, 2009.
United States Patent and Trademark Office, U.S. Appl. No. 11/537,599, Office Action mailed Sep. 15, 2009.
United States Patent and Trademark Office, U.S. Appl. No. 11/744,591, Office Action mailed Jul. 31, 2009.
United States Patent and Trademark Office, U.S. Appl. No. 11/744,591, Amendment and Response to Office Action, filed Feb. 1, 2010.
United States Patent and Trademark Office, U.S. Appl. No. 11/744,591, Office Action mailed May 10, 2010.
United States Patent and Trademark Office, U.S. Appl. No. 11/744,591, Amendment "B" & Response filed Jul. 23, 2010.
United States Patent and Trademark Office, U.S. Appl. No. 11/345,202, Office Action mailed Jul. 2, 2009.
United States Patent and Trademark Office, U.S. Appl. No. 11/279,360, Office Action mailed Jun. 11, 2009.
United States Patent and Trademark Office, U.S. Appl. No. 11/537,602, Office Action mailed Sep. 10, 2009.
United States Patent and Trademark Office, U.S. Appl. No. 11/537,595, Office Action mailed Sep. 16, 2009.
United States Patent and Trademark Office, U.S. Appl. No. 11/413,829, Office Action mailed Sep. 1, 2009.
U.S. Appl. No. 11/413,829, Amendment and Response to Office Action filed Jan. 25, 2010.
United States Patent and Trademark Office, U.S. Appl. No. 11/413,829, Office Action mailed Feb. 19, 2010.
United States Patent and Trademark Office, U.S. Appl. No. 11/413,829 Amendment "C" & Response filed Jun. 21, 2010.

* cited by examiner

PROTOCOLS FOR OUT-OF-BAND COMMUNICATION

CROSS-REFERENCE TO RELATED APPLICATIONS

This application is a continuation-in-part of the following applications, which are hereby incorporated by reference: U.S. patent application Ser. No. 11/134,786 filed May 20, 2005; U.S. patent application Ser. No. 11/204,920 filed Aug. 15, 2005; U.S. patent application Ser. No. 11/344,883 filed Feb. 1, 2006; U.S. patent application Ser. No. 11/348,745 filed Feb. 7, 2006; U.S. patent application Ser. No. 11/279,360 filed Apr. 11, 2006; U.S. patent application Ser. No. 11/413,829 filed Apr. 28, 2006; U.S. patent application Ser. No. 11/537,602 filed Sep. 29, 2006; U.S. patent application Ser. No. 11/537,590 filed Sep. 29, 2006; U.S. patent application Ser. No. 11/537,599 filed Sep. 29, 2006; U.S. patent application Ser. No. 11/537,595 filed Sep. 29, 2006; U.S. patent application Ser. No. 11/685,548 filed Mar. 13, 2007; U.S. patent application Ser. No. 11/685,551 filed Mar. 13, 2007; and U.S. patent application Ser. No. 11/744,591 filed May 4, 2007.

BACKGROUND OF THE INVENTION

1. The Field of the Invention

The present invention relates to systems and methods for out-of-band communication across optical transceiver modules of a network fabric.

2. The Relevant Technology

In modern networks, network devices such as switches, routers, host bus adapters (HBA), servers, and the like, are coupled to one another by means of fiber optic transceivers. Many transceivers are "active," meaning that they have memory and processing capabilities. U.S. patent application Ser. No. 11/070,757, filed Mar. 2, 2005, which is hereby incorporated by reference, discloses systems and methods by which transceiver modules communicate with one another independently of the network device from which they receive data. The '757 application discloses a system wherein an optical transceiver module modulates the peak or average power of a transmitted signal at a low frequency in order to transmit module specific data out of the frequency band carrying the network data transmitted by the module. A receiving module demodulates the out-of-band data by tracking modulation of the peak or average power of the received signal.

In a typical network, components are not all updated or replaced simultaneously. Both new and old components must therefore be able to communicate with one another even though older components may not be updated. Some transceivers have firmware that may be reprogrammed to facilitate communication with newer modules. However, it is not convenient to update each transceiver in a network each time a newer module is installed. Furthermore, older transceivers have physical limitations, such as a smaller memory, lower processing speed, and less sophisticated optics that cannot be readily updated.

In view of the foregoing, it would be an advancement in the art to provide systems and methods for enabling out-of-band communication across a heterogeneous fiber optic network including transceiver modules of differing capabilities.

BRIEF SUMMARY OF THE INVENTION

In one aspect of the invention, communication between transceiver modules having a memory defining a number of tables each having a size and offset address includes determining a table and offset address for requested data according to a table size of an originating module. A system address corresponding to the table and offset address is generated and a read command having a command type indicating a system address size, the system address, a length of the requested data, and a contingency field storing the table size of the originating module is transmitted to a receiving module. The receiving module regenerates the table and offset address from the system address and the table size stored in the contingency field. If the table size stored in the contingency field is the same as a table size of the receiving module, then data having the length of the requested data stored at an address corresponding to the table and offset address is transmitting to the receiving module. If the table size stored in the contingency field is not the same as the table size of the receiving module, data having a length different from the requested length from a table of the receiving module having a table number corresponding to the regenerated table and offset address is transmitted.

In another aspect of the invention, the receiving module evaluates whether it has sufficient memory to return data having the length of requested data beginning at the regenerated table and offset address, and, if not, evaluating an extended contingency field. If the extended contingency field does not contain an instruction not to truncate, the receiving module transmits to the originating module data beginning at the regenerated table and offset address having a length less than the length of requested data.

In another aspect of the invention, communication between the originating and receiving modules occurs in an out-of-band optical channel.

In another aspect of the invention a method for discovering a network fabric includes transmitting a first knock knock command from the transmit port of a first transceiver module of a plurality of transceiver modules having receive ports and transmit ports. If a response to the first knock knock command is received at the receive port of the first transceiver module, then the first transceiver records an indicator that it is in a point-to-point network. If a response to the first knock knock command is not received at the receive port of the first transceiver module, then it sends a second knock knock command containing an instruction to forward the second knock knock command N times, where N is greater than 1. If a response to the second knock knock command is received at the receive port of the first transceiver module, then the first transceiver module an indicator that it is in a ring network having N layers.

if a response to the second knock knock command is not received at the receive port of the first transceiver module, then it sends a plurality of subsequent knock knock commands each containing an instruction to forward, wherein each subsequent knock knock command instructs a receiving transceiver module to forward the subsequent knock knock command M times, where M is the number of times the previous knock knock command of the subsequent knock knock commands instructs the receiving transceiver module to forward the subsequent knock knock command plus an increment value. If a response to one of the subsequent knock knock commands is received, then the first transceiver module records an indicator that the first transceiver module is in a ring network having M layers. If a response to one of the subsequent knock knock commands having a value of M greater than a maximum value is not received, then the first transceiver module records an indicator that the first transceiver module is not in a ring or point-to-point network.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
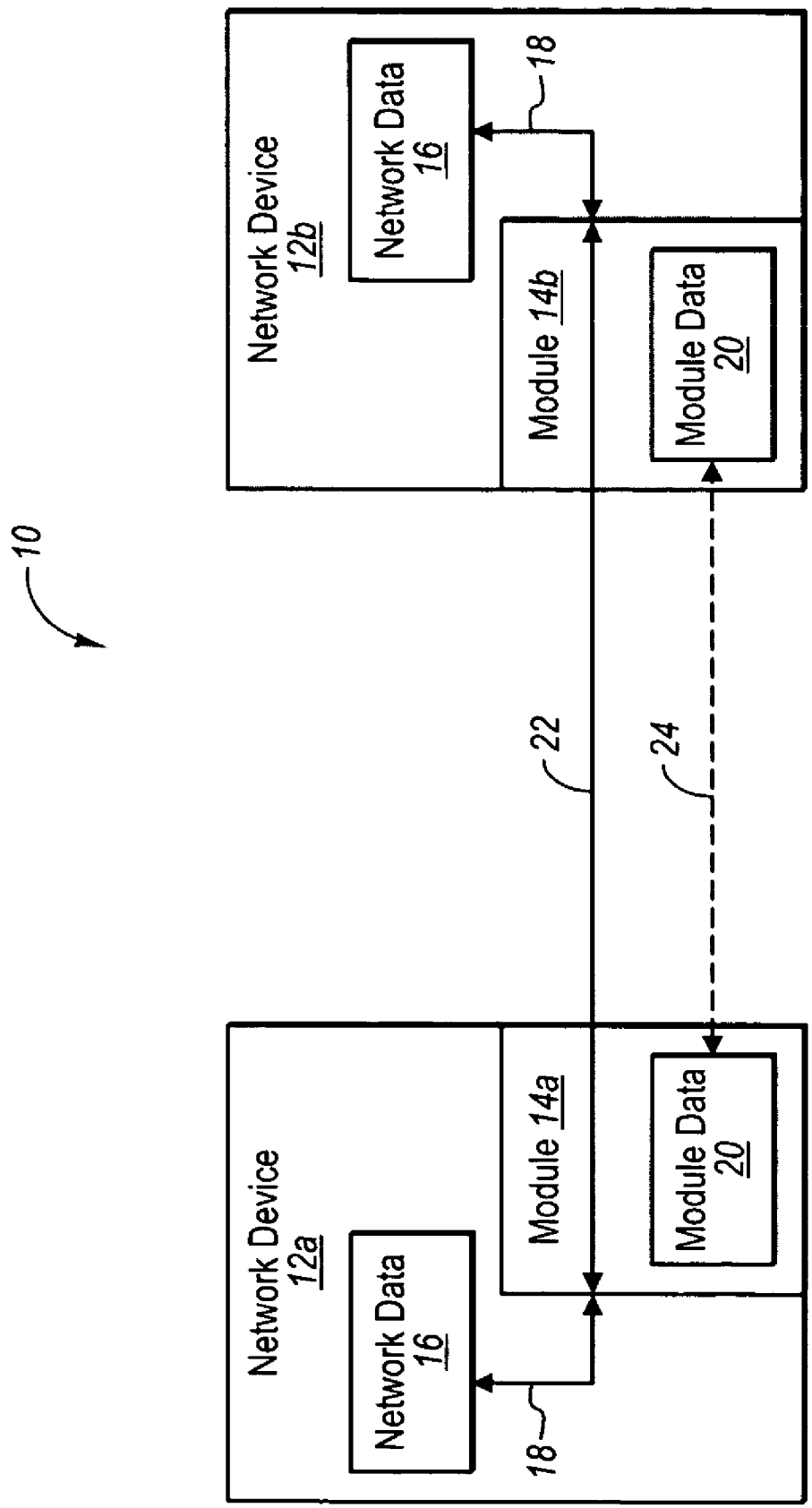
FIG. 1 illustrates a schematic block diagram of in-band and out-of-band links transceiver modules hosted by network devices in accordance with an embodiment of the present.

Referring to FIG. 1, a network 10 includes a number of network devices 12a, 12b. The network devices may be embodied as workstations, servers, switches, routers, host bus adapters, or the like. Transceiver modules 14a, 14b are coupled to each network device 12a, 12b and received network data 16 by means of a data channel 18. In the illustrated embodiment, the transceiver modules 14a, 14b are optical transceivers including a transmitter optical subassembly (TOSA) and a receiver optical subassembly (ROSA). The transceiver modules 14a, 14b may conform to any industry standard form factor such as SFP, XFP, X2, XPAK, or XENPAK.

The transceiver modules 14a, 14b store module data 20 that includes diagnostic and operational data that is used by the modules 14a, 14b to control parameters governing the transmission of data over an optical fiber, such as output power, carrier frequency, bit period, duty cycle, rise time, fall time and the like. Module data 20 may include data relating to receiving of data over an optical fiber such as eye profile, eye mask parameters, threshold, sensitivity, and the like. The module data 20 may include diagnostic data regarding itself and another module 14a, 14b to which it is connected. Such data may include the received power, recovered clock frequency, bit error rate, or the like, of a received signal. The diagnostic data may include self diagnostic data such as the results of self-tests of a module component such as a laser.

The modules 14a, 14b are coupled to one another by a data channel 22 and an out-of-band (OOB) channel 24. In a preferred embodiment, the data channel 22 and OOB channel 24 include the same physical medium, such as an optical fiber. For example, the data channel 22 may include high frequency modulation of an optical signal transmitted over an optical fiber whereas the OOB channel 24 includes low frequency modulation of the power envelope of the same optical signal, such as is disclosed in U.S. patent application Ser. No. 11/070,757, which is incorporated herein by reference. In other embodiments, the data channel 22 includes optical signals transmitted over an optical fiber or wire whereas the OOB channel 24 includes a radio frequency (RF) channel.

The network data 16 is transmitted over the data channel 22 by the transceiver modules 14a, 14b. Diagnostic and configuration data included in the module data 20 are communicated to other transceiver modules 14a, 14b in the OOB channel 24. However, in some embodiments, both diagnostic and configuration and network data are transmitted over the same data channel 22. For purposes of this disclosure all communication over an OOB channel 24 may also take place over the in-band data channel 22. OOB channel 24 may also carry instructions from a transceiver 14a to a transceiver 14b. For example, U.S. application Ser. No. 11/966,646 discloses a test transceiver that communicates with a corrective transceiver to generate network errors for diagnostic purposes. Communication between the test transceiver and corrective transceiver in the abovereferenced application may occur in the OOB channel 24. For example, the test transceiver may instruct the corrective transceiver not to correct for errors that the test transceiver introduces into the data channel 22. In other applications a transceiver 14a may instruct a transceiver 14b by means of the OOB channel 24 to encrypt data in the data channel 22.

Examples of systems that may use an OOB channel 24 to transmit diagnostic and configuration information include those disclosed in U.S. patent application Ser. No. 11/134,786 filed May 20, 2005; U.S. patent application Ser. No. 11/204,920 filed Aug. 15, 2005; U.S. patent application Ser. No. 11/344,883 filed Feb. 3, 2006; U.S. patent application Ser. No. 11/348,745 filed Feb. 7, 2006; U.S. patent application Ser. No. 11/279,360 filed Apr. 11, 2006; U.S. patent application Ser. No. 11/413,829 filed Apr. 28, 2006; U.S. patent application Ser. No. 11/537,602 filed Sep. 29, 2006; U.S. patent application Ser. No. 11/537,590 filed Sep. 29, 2006; U.S. patent application Ser. No. 11/537,599 filed Sep. 29, 2006; U.S. patent application Ser. No. 11/537,595 filed Sep. 29, 2006; U.S. patent application Ser. No. 11/685,548 filed Mar. 13, 2007; U.S. patent application Ser. No. 11/685,551 filed Mar. 13, 2007; and U.S. patent application Ser. No. 11/744,591 filed May 4, 2007.

Figure 2:
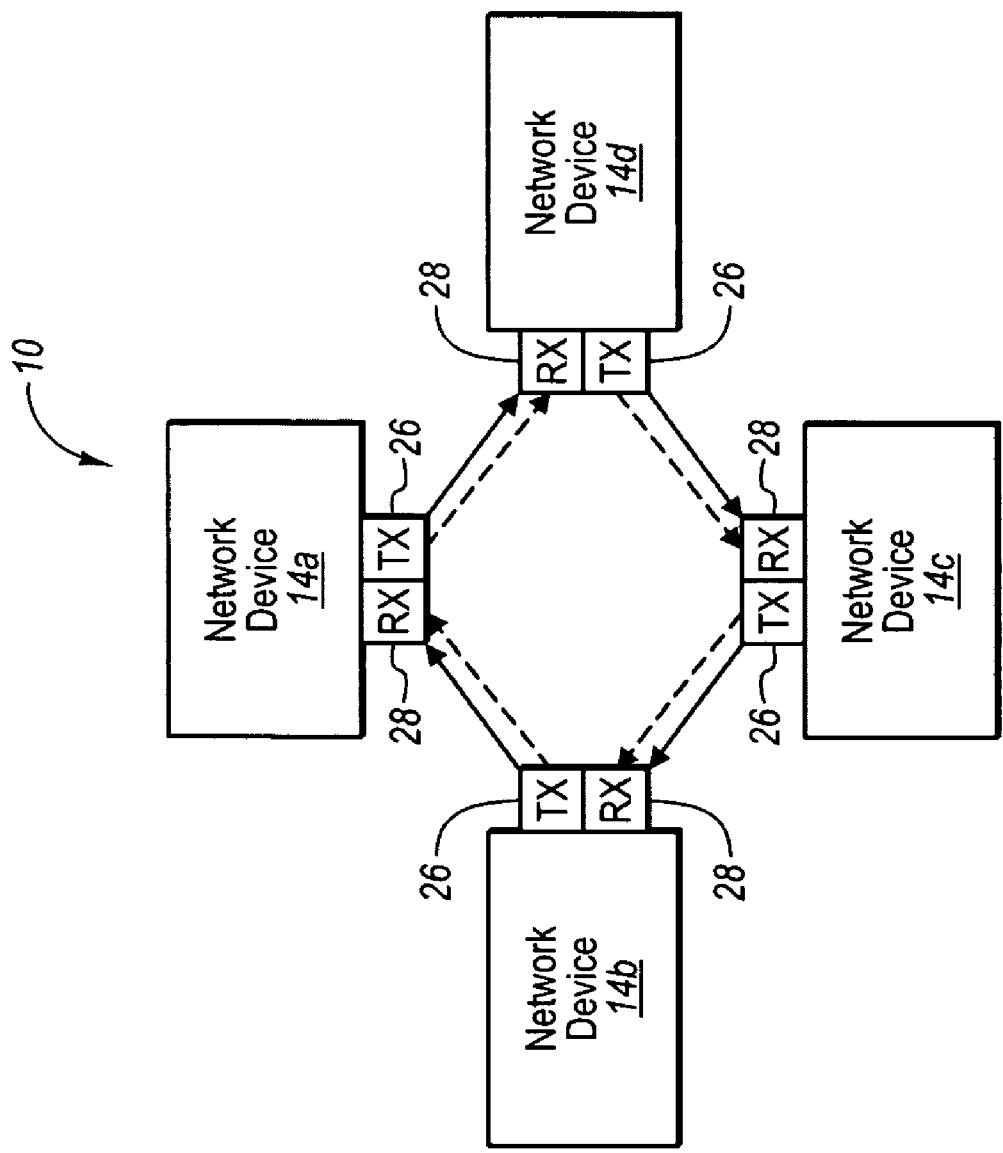
FIG. 2 is a schematic block diagram of a ring network.

Referring to FIG. 2, the network 10 may have a "ring" configuration, in which the transmit port 26 of a transceiver module 14a, for example, is coupled to the receive port 28 of a transceiver module 14d and the receive port 28 of the transceiver module 14a is coupled to the transmit port 26 of a transceiver module 14b. In this manner, data must be circulated through a number of intervening transceiver modules 14a-14d before reaching a destination module 14a-14d. For example, in order to transmit data from transceiver module 14a to transceiver module 14b, the data must be transmitted through modules 14d and 14c.

Figure 3:
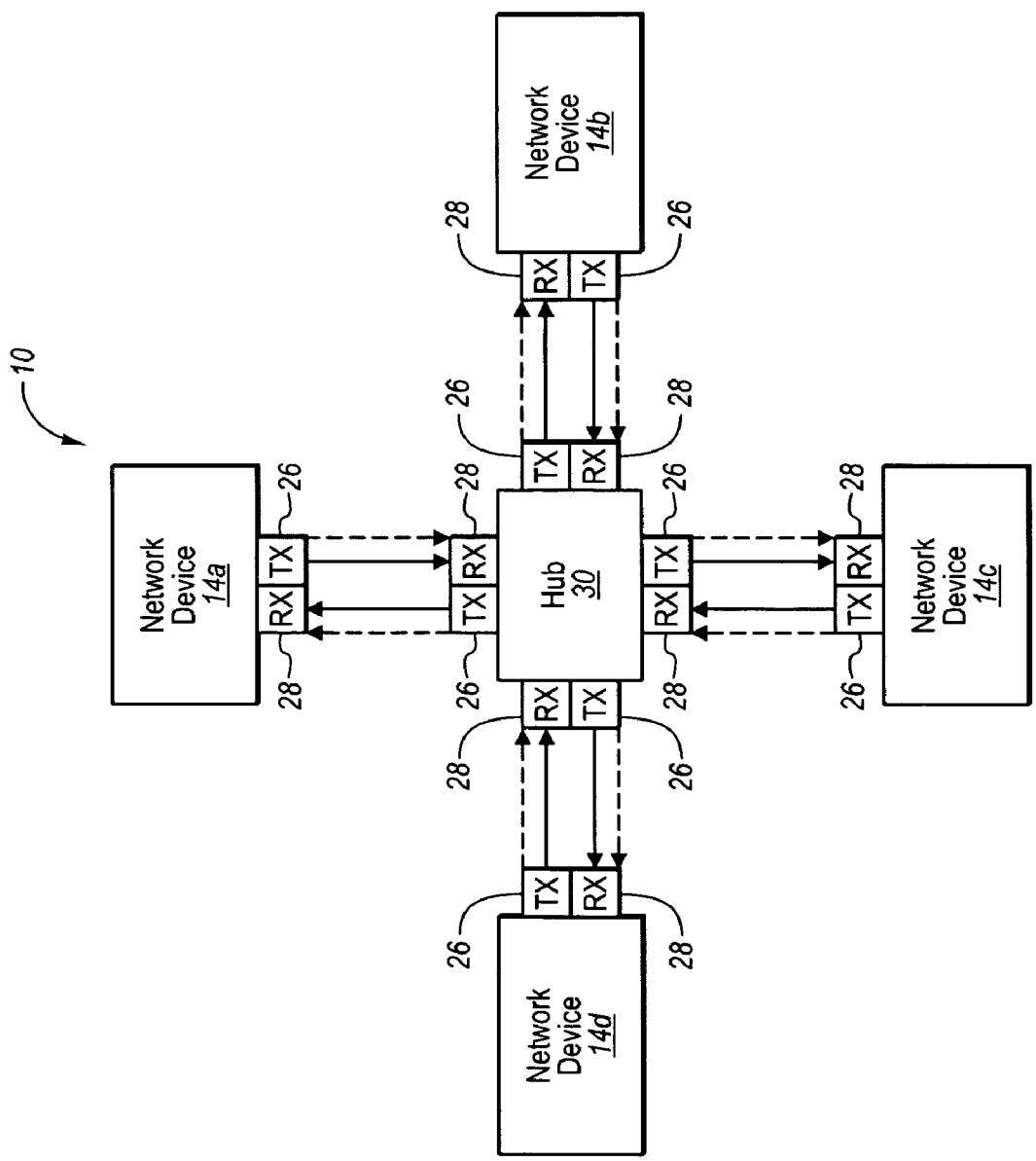
FIG. 3 is a schematic block diagram of a star network.

Referring to FIG. 3, in some embodiments, the network 10 may have a "star" configuration, in which both the transmit port 26 and receive port 28 of each transceiver 14a-14d is coupled to a corresponding transmit port 26 and receive port 28 of a hub 30. The hub 30 routes signals to the receive port 26 of the destination network device 14a-14d. In this manner, data needs to travel through at most one other device before reaching a destination device 14a-14d.

Figure 4:
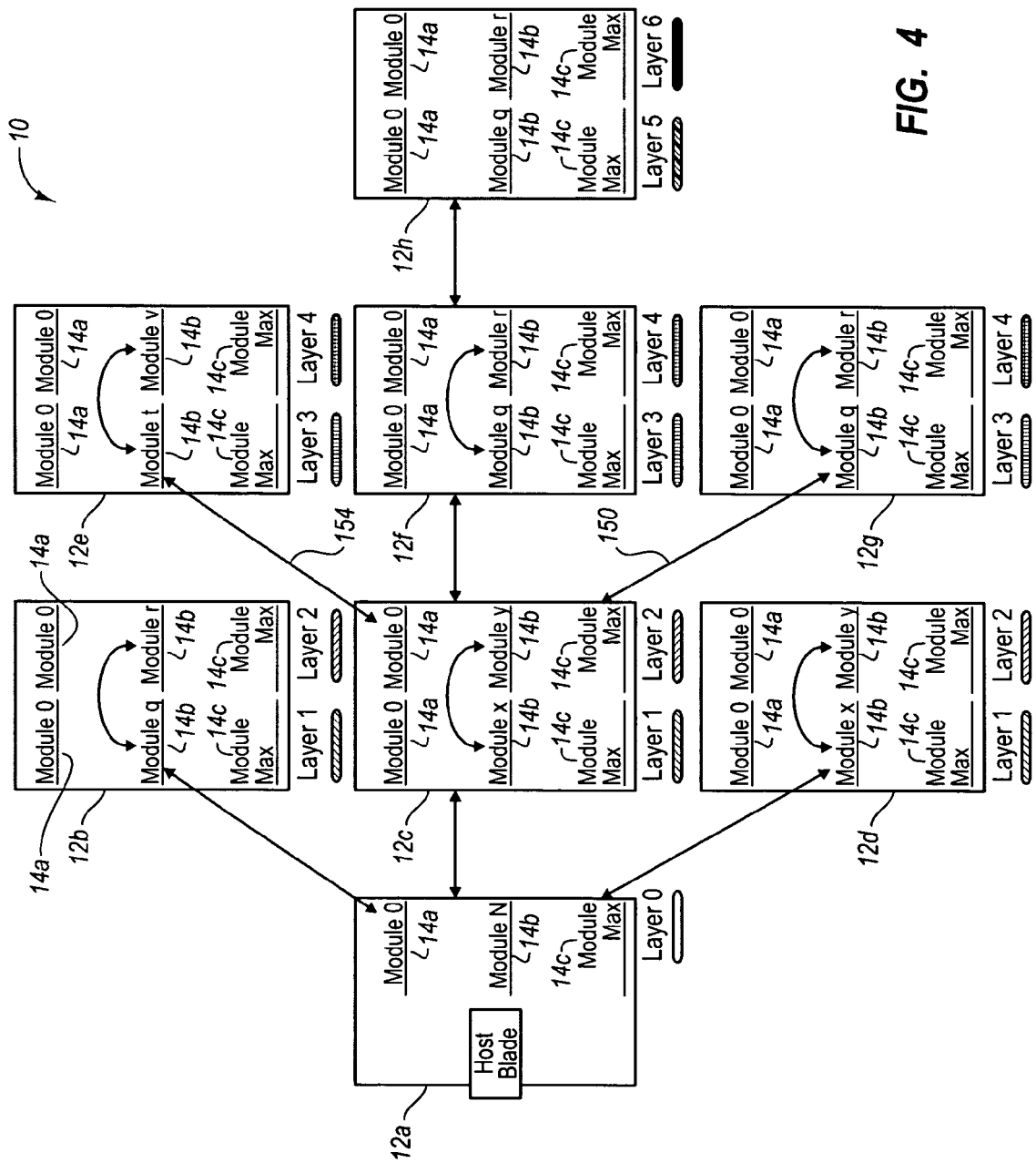
FIG. 4 is a schematic block diagram of a network fabric.

Referring to FIG. 4, in some embodiments, a network 10 is arranged in layers in which a network device 12a of layer 0 includes a plurality of modules 14a-14c each coupled to modules 14a-14c of network devices 12b-12c in layer 1. The network devices 12b-12c further include modules 14a-14c that are part of layer 2 coupled to modules 14a-14c of network devices 12d-12f defining a layer 3, and so on. It is readily apparent that some network devices include modules 14a-14c belonging to two different layers. The network devices 12a-12c may control routing of data through the network. For example, the network devices 12a-12h may be embodied as routers or switches for directing network traffic.

In some embodiments, modules 14a-14c in a first layer are able to communicate with modules 14a-14c of a second layer that are coupled to the same network device 12a-12f by means of a host bridge 32. The host bridge transfers module data 20 from one module 14a-14c to another, in the same or a different layer, that are coupled to the same network device 12a-12f. In some embodiments, a module 14a-14c may set a bit in data output to the network device 12a-12f to which it is coupled indicating that it has module data 20 to transmit to another module 14a-14c. The network 12a-12f may then read the module data 20 and transfer it to another module 14a-14c coupled thereto. The network device 12a-12f may transfer the data by setting a bit in data provided to the destination module 14a-14c indicating that module data 24 is available to be input to the destination module 14a-14c. The destination module 14a-14c may then store data received as module data 20, rather than transmitting it over the data channel 18.

Communications between modules 14a-14c included in any of the foregoing, and other, network configurations may follow a protocol accommodating different capacities of modules 14a-14c. Communications may include packets of data having fields described in Table 1, below.

TABLE 1

Data Packet Field Definitions

| Field | Bits | Description |
|---|---|---|
| Preamble | 8 | To inform other device that something will be sent |
| Lock | 3 | To allow other device to lock on start of sequence |
| Communication Type (CT) | 8 | 0x01 = Knock Knock<br>0x02 = Acknowledge<br>0x03 = Command/system address = 16 bits<br>0x04 = Response 16 bits<br>0x05 = Communication Corrupted<br>0x06 = Communications stopped<br>0x07 = Command/system address = 32 bits<br>[0x08-0x0F = cross fabric communications for ring or star networks]<br>0x051 = Mass Error Alert (See FIG. 7) |
| Communication ID (C-ID | 8 | Originator creates this starting as a random number. Respondent returns this same number. Originator increments number for each next communication it originates |
| Sync | 8 | Alternate bits (01010101) to verify that no bits have been dropped such that data is now in the wrong place |
| Command ID (CMD) | 8 | See Table 2 |
| System Address | Depends on CT | CT = 0x03 -- 16bits<br>CT = 0x07 -- 32 bites |
| Length | Depends on CT | CT = 0x00 -- 0x10<br>CT = 0x0A through 0x FF -- Not yet defined |
| Data Bytes | Depends on Length | |
| Sync | 8 | Alternate bits to verify that no bits have been dropped such that data is now in the wrong place (01010101) |
| Status/Contingency | 16 | Status of response 0x0000 - OK<br>Other Values - error type |
| Extended Status/Contingency | 16 | Extended status of response.<br>Meaning of value depends on Status (error messages, version information, contingency instructions,) |
| Wrapper Count (WC)/Layer | 16 | Wrapper = Number of Communication IDs included in wrapper when communicating across a network fabric<br>Layers = a layer count incremented for each layer across which the data packet is transmitted. May be negative depending on the location of module originating a data packet in relation to the module that initiated communication. |
| Wrappers/Layers | (depends on WC) | Wrappers = Communication IDs are placed in this field as a data packet is passed along the fabric, creating a trail describing the network.<br>Layer = depends on layer of originating module. The layer field does not change as the data packet is forward along the fabric. Layer may be negative where the module originating the message has a |

TABLE 1-continued

Data Packet Field Definitions

| Field | Bits | Description |
|---|---|---|
| | | lower layer number than the module that initiated communication. |
| Communication Complete | 3 | Signals communication is over |

The Preamble field contains a sequence of bits that communicate to a receiving transceiver that a data packet is being sent. The Preamble field may be any sequence of bits that serves this function. The Lock field includes a sequence of bits enabling a receiving transceiver to lock onto the start of the sequence. The Lock field may enable the receiving transceiver to recognize the starting bit of the data packet. The Lock field may also enable a clock data recovery (CDR) circuit to generate a clock signal synchronous with bit transitions within data packet.

Sync Fields are provided at one, two, or more positions within the packet. The Sync Fields may include alternating bits, i.e., 10101010, to enable the receiving transceiver to evaluate whether received bits are properly positioned. For example, if the receiver had shifted one bit position out of synchronization, then evaluation of the Sync Fields would enable detection and correction of the error. The final field of the data packet may be a Communication Complete Field, which contains a data code indicating to the transceiver that the complete data packet has been received.

The Communication Type field defines how subsequent fields of the data packet will be interpreted. In particular, the number of fields in the packet may be different depending on the Communication Type field.

In a first example, the Communication Type field defines the number of bits that are used to define the address field in a read or write command. As noted in Table 1, where the Communication Type field is equal to 0x03, a following Command/System Address field has a length of 16 bits. When the Communication Type field is equal to 0x07, a following Command/System Address field has a length of 32 bits. Other values for the Communication Type field may define other lengths for the Command/System Address field.

In some embodiments, the Communication Type field also communicates information to set up and provide feedback regarding a connection between transceivers. For example, a value of 0x01 may indicate that a data packet is a Knock Knock command instructing the receiving transceiver to respond with a packet having a Communication Type field equal to 0x02, which corresponds to an Acknowledge message.

In some embodiments a value of 0x05 indicates that communication between the transceivers has become corrupted and a value of 0x06 indicates that communication has stopped. The definitions for values of the Communication Type field are exemplary and may be assigned arbitrarily.

The Communication ID field identifies the data packet. Upon generating a data packet, the sending transceiver will insert a random string of bits in the Communication ID field. The receiving transceiver will use the same Communication ID in its response. The sending transceiver may then increment the Communication ID and use the incremented value in the next communication. In some embodiments, the value for the initial Communication ID is taken from the transceivers "live data" which refers to measured parameters regarding optical data transmitted from and received by the transceiver, such as output power, received power, temperature, and the like.

The communication identifier used by the requestor can also be used as an encryption seed for a command or response to a communication in addition to public and private keys known to the transmitting and receiving module. For a subsequent command or response the encryption seed may be based on the next random Communication identifier. The random number may be seeded by a byte of the live data, which tends to be random.

Exemplary values for the Command Identifier field are summarized in Table 2. As is apparent in Table 2, the function associated with values of the Command Identifier field is dependent on the value of the Command Type field. The function and number of subsequent fields in the data packet may be dependent on the Command Type and Command Identifier fields.

TABLE 2

Command Descriptions

| Communication Type | Command | Description | Fields |
|---|---|---|---|
| 0x01 | 0x00 | Knock knock | C-ID/Sync/CMD/status/extended status/checksum/communication complete |
| 0x01 | 0x01 | Knock knock | C-ID/Sync/CMD/status/extended status/layer count/layer/checksum/communication complete |
| 0x02 | 0x00 | Acknowledge | C-ID/Sync/CMD/status/extended status/checksum/communication complete |
| 0x02 | 0x01 | Acknowledge | C-ID/Sync/CMD/status/extended status/layer count/layer/ checksum/communication complete |
| 0x03 | 0x01 | Read request | C-ID/sync/CMD/system address 16 bits/length/sync/ |

TABLE 2-continued

Command Descriptions

| Communication Type | Command | Description | Fields |
|---|---|---|---|
| | | | contingency/extended contingency/checksum/ communication complete |
| 0x03 | 0x02 | Write request | C-ID/sync1CMD/system address 16 bits/length/data bytes/sync/contingency/extended contingency/checksum/ communication complete |
| 0x04 | 0x01 | Read response | C-ID/sync/CMD/system address 16 bits/length/data bytes/sync/status/ extended status/checksum/ communication complete |
| 0x04 | 0x02 | Write response | C-ID/sync/CMD/system address 16 bits/length/sync/status/extended status/checksum/communication complete |
| 0x05 | 0x00 | Sync byte out of place | C-ID/sync/CMD/status/extended status/checksum/communication complete |
| 0x05 | 0x01 | Checksum problem | C-ID/sync/CMD/status/extended status/checksum/communication complete |
| 0x06 | 0x00 | Not receiving out-of-band | C-ID/sync/CMD/status/extended status/checksum/communication complete |
| 0x06 | 0x01 | Not receiving data | C-ID/sync/CMD/status/extended status/checksum/communication complete |
| 0x07 | 0x01 | Read request | C-ID/sync/CMD/system address 32 bits/length/sync contingency/extended contingency/checksum/communication complete |
| 0x07 | 0x02 | Write request | C-ID/sync/CMD/system address 32 bits/length/sync/contingency/extended contingency/checksum/communication complete |
| 0x08 | 0x01 | Read Response | C-ID/sync/CMD/system address 32 bits/length/data bytes/sync/status/extended status/checksum/communication complete |
| 0x08 | 0x02 | Write Response | C-ID/sync/CMD/system address 32 bits/length/sync/status/extended status/checksum/communication complete |

Figure 5:
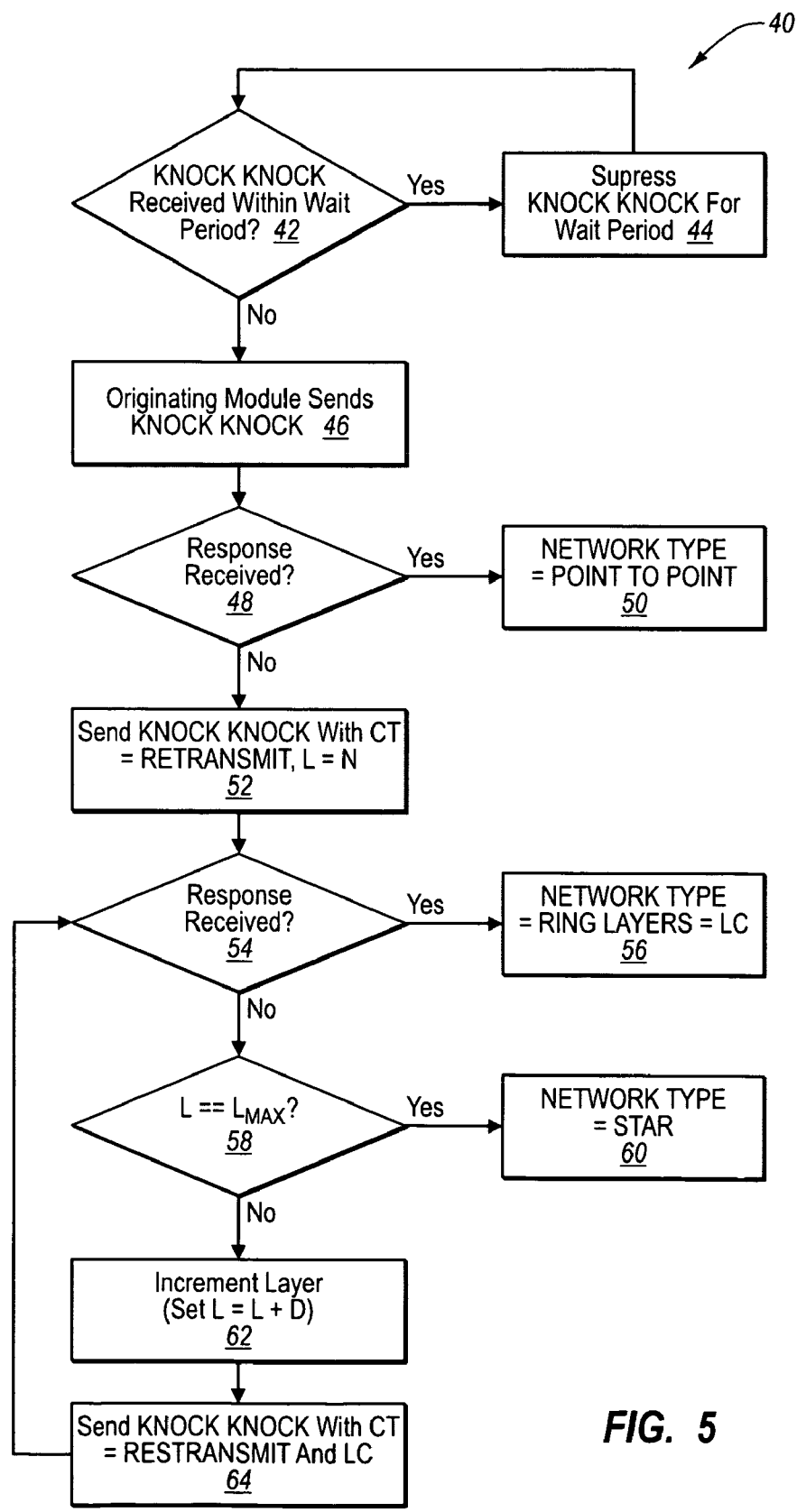
FIG. 5 is a process flow diagram of a method for discovering module connections in accordance with an embodiment of the present invention.

Referring to FIG. 5, a method 40 may be used for initiating communication between a transmitting module and a receiving module. The method 40 may include evaluating whether a Knock Knock message has been received recently at step 42. If so, in order to prevent a storm of Knock Knock messages, the transmitting module may suppress sending of a Knock Knock command for a waiting period at step 44. Step 42 may then be repeated. If at step 42 no Knock Knock message has been received, step 46 may be executed by transmitting a Knock Knock message to the receiving module. Step 46 may include transmitting a Knock Knock message directly to the receiving module without any instruction to pass it on to another module. For the example commands of Table 2, this may be accomplished by transmitting a data packet having CT=0x01 and CMD=0x00.

At step 48, the method 40 includes evaluating at the transmitting module whether a response has been received at the receiving module. A response may include an Acknowledge message including data packet having CT=0x02 and CMD=0x00 as illustrated in Table 2. If a response is received at step 48, then the network type is point-to-point wherein the transmitter and receiver of the transmitting module are coupled to the receiver and transmitter, respectively, of the receiving module. Step 50 may therefore include recording this fact within the transmitting module, such as by setting a Network Type variable or setting to a value corresponding to a point-to-point network, such as a value for a layer count of the network equal to 1 or 0 indicating a point to point connection.

If no response is received at step 48, then step 52 is performed, which includes sending a Knock Knock message that instructs the receiving module to retransmit the message. The Knock Knock message may further instruct N subsequent receiving modules to retransmit the message. For example, the transmitting module may transmit a message having CT=0x01 and CMD=0x01. As noted in Table 2, this command includes Layer Count and Layer fields. The Layer field may indicate the number of times that the message is to be re-transmitted. The Layer count may indicate to a receiving module how many times the message has already been retransmitted. The receiving module, and any subsequent receiving module, may then compare the Layer Count to the Layer field, if the layer count is less than the layer field, then the module will increment the layer count and retransmit the message. Step 52 may include setting the Layer field to an initial value N, such as 10, or some other value.

In some embodiments, the Layer Count and Layer field relate to Wrappers, rather than layers. For some communications, a receiving module will generate a data packet, or wrapper, having a received data packet embedded therein, such as in the Data field. In such embodiments, the Layer Count field indicates the number of wrappers in the data packet. In such instances the Layer field indicates the number of wrappers at which the original data packet has reached its destination. In some embodiments, the wrappers may be used to conduct fabric discovery as each intervening module that receives a discovery request adds a wrapper that may include a unique Communication ID, and perhaps other data such as the live data of the intervening module. The final wrapper will therefore contain data from each of the intervening modules. Alternatively, wrappers may consist only in addition of a module identifier or communication ID into the wrapper field. A module forwarding a data packet with a wrapper may also increment the wrapper count field.

Step 54 may include evaluating at the original transmitting module whether a response has been received. The response may include one of the Acknowledge messages outlined in Table 2. A response may be received from a transceiver having its transmit port coupled to the receiver port of the original transmitting module.

If a response is received at step 54, then the network is a ring network wherein the transmitter and receiver of the transmitting module are coupled to the receiver and transmitter of different modules, such as is illustrated in FIG. 2. Step 56 may therefore include recording this fact within the transmitting module, such as by setting a Network Type variable or setting to a value corresponding to a ring network. Step 56 may also include noting that the number of layers in the ring network is equal to the value of the Layer field in the Knock Knock message sent in the last iteration of step 52.

If no response has been received at step 54, then step 58 may be performed which includes comparing the value of the layer field from step 52 (or previous iteration of step 64 described below) to determine whether it exceeds an $L_{MAX}$ value. If it does, then step 60 includes recording within the original transmitting module that the network is a star type.

If the value of the layer field from step 52 (or a previous iteration of step 64 described below) does not equal or exceed the $L_{MAX}$ value, then the layer field is incremented by an increment amount D, such as 1, 5, 10, or some other value at step 62. Inasmuch as a ring networks typically do not have more than twenty layers, $L_{MAX}$ may be equal to 20 in some embodiments. At step 64, another Knock Knock message is transmitted having the Layer field equal to the incremented value calculated at step 62. Step 54 may then be repeated.

Figure 6:
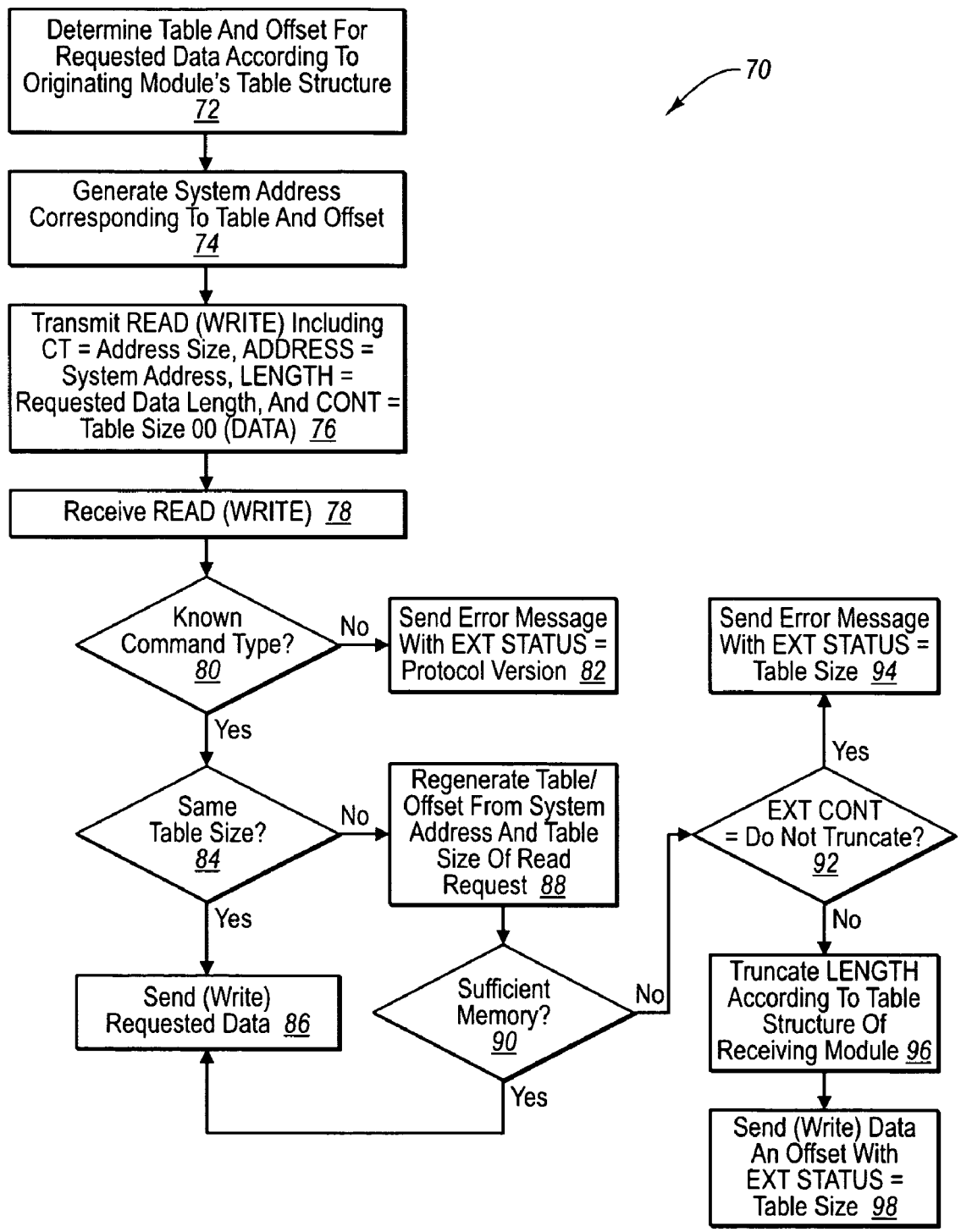
FIG. 6 is a process flow diagram of a method for reading and writing data between dissimilar transceivers in accordance with an embodiment of the present invention.

In many networks, transceiver modules are replaced one at a time as they begin to fail. Accordingly, newer transceivers will often be required to communicate with older transceivers with less functionality. Accordingly, the method 70 of FIG. 6 may be used to accommodate such differences.

In typical transceiver modules, data is accessed with reference to a table number and a position or "offset" within the table corresponding to the table number. The size of each table may vary depending on the amount of memory in the module and the standard or "multi-source agreement" (MSA) with which it complies. As standards develop, the type of data stored in each table may be augmented, but previously defined table locations are maintained the same. Accordingly, as table sizes increase, the initial storage locations in each table may conform to previous standards, whereas subsequent table locations contain other types of data defined by newer standards. Methods in accordance with embodiments of the present invention accommodate such table/offset standards, but are capable of use in the absence of such standards.

In one embodiment, the method 70 includes determining at 72 by a transmitting module the table/offset address of data that the transmitting module intends to write to or request from a receiving module as defined by a standard with which the transmitting programmed has been programmed to comply.

At step 74, the transmitting module translates the table/offset address into a system address. The division of transceiver memory into tables is typically logical and the data is actually stored in random access memory embodied as an undifferentiated array of memory locations 0-N. Accordingly, the table/offset address may be mapped to a specific memory location referred to as a system address. For example, where a transceiver has tables of 256 bytes, table 0/offset 124, may be mapped to system address 124, whereas table 1/offset 124 may be mapped to system address 380.

At step 76, a Read or Write request is transmitted to a receiving module. The request may include data packet having CT=0x03 and CMD=0x01 (16 bit read request), CT=0x03 and CMD=0x02 (16 bit write request), CT=0x07 and CMD=0x01 (32 bit read request), CT=0x07 and CMD=0x02 (32 bit write request) as defined by Table 2. The request may also include some other Read or Write request that define layer and layer count fields in order to address a transceiver other than to which the transmitting receiver is immediately coupled.

A read request preferably includes a Command Type (CT) field that defines the system address length (e.g. 16 or 32 bits). The read request may also indicate the system address calculated at step 74 in the System Address field and the length of requested data in the Length field. In some embodiments of the invention, the read request also stores the table size of the transmitting module in the Status/Contingency field. A write request may additionally include data stored in the Data field to be written in the memory of the receiving module. In a write request, the Length field may refer to the number of bytes included in the Data field, or the number of address locations occupied by the data included in the Data field At step 78, the read or write request is received. At step 80, the receiving module evaluates whether it recognizes the Command Type field. Where the receiving module is older than the transmitting module, the Command Type field may not be recognized. If the command type is not recognized, then step 82 may be executed, which include sending an error message, which may be embodied as a data packet having the Extended Status field storing an identifier of the protocol version of the receiving module. On receiving the error message the original transmitting module may transmit subsequent Read and Write requests that conform to the protocol indicated in the error message.

If the command type is recognized, then step 84 may be executed, which includes determining whether the table size stored in the Status/Contingency field of the read or write request is the same as that of the receiving module. If they are the same, then the method 70 may include sending the data stored at the system address of the receiving module indicated in a read request or writing data to the system address indicated in a write request at step 86.

If the table sizes are not the same, then at step 88 the system address of the read or write request may be translated into a table and offset of the transmitting module using the table size stored in the Contingency field of the read or write request. At step 90, the receiving module evaluates whether it has sufficient memory to read or write the amount of data specified in the Length field beginning at the table/offset determined at step 88. If it does, then the requested data may be transmitted to the transmitting module or written to the memory of the receiving module at step 86.

If the receiving module is found not to have sufficient memory, then the Extended Contingency field of the read or write request may be examined at step 92. If the Extended Contingency field contains a value instructing the receiving module not to truncate its response, then an error message is sent at step 94 with an Extended Status field storing the table size of the receiving module. If the Extended Contingency field does not instruct the receiving module not to truncate its response, then the value of the Length field of the read or write request is truncated at step 96 and the truncated amount of data is either transmitted to the original transmitting module or written to the receiving module at step 98 according to the table/offset calculated at step 88. Step 98 may include transmitting a Write Response or Read Response (see Table 2) having an Extended Status field storing the table size of the receiving module. In some embodiments, where the receiving module has a larger memory or at least a larger table size, the receiving module will analyze the table size in a received read or write request and transmit only data in tables up to the table size of the transmitting module to the receiving module. For example, if the transmitting module has a table size of 128 and the receiving module has a table size of 256, then the receiving module may respond to a request for data in table 1, for example, by sending only 128 bytes of data therefrom.

Figure 7:
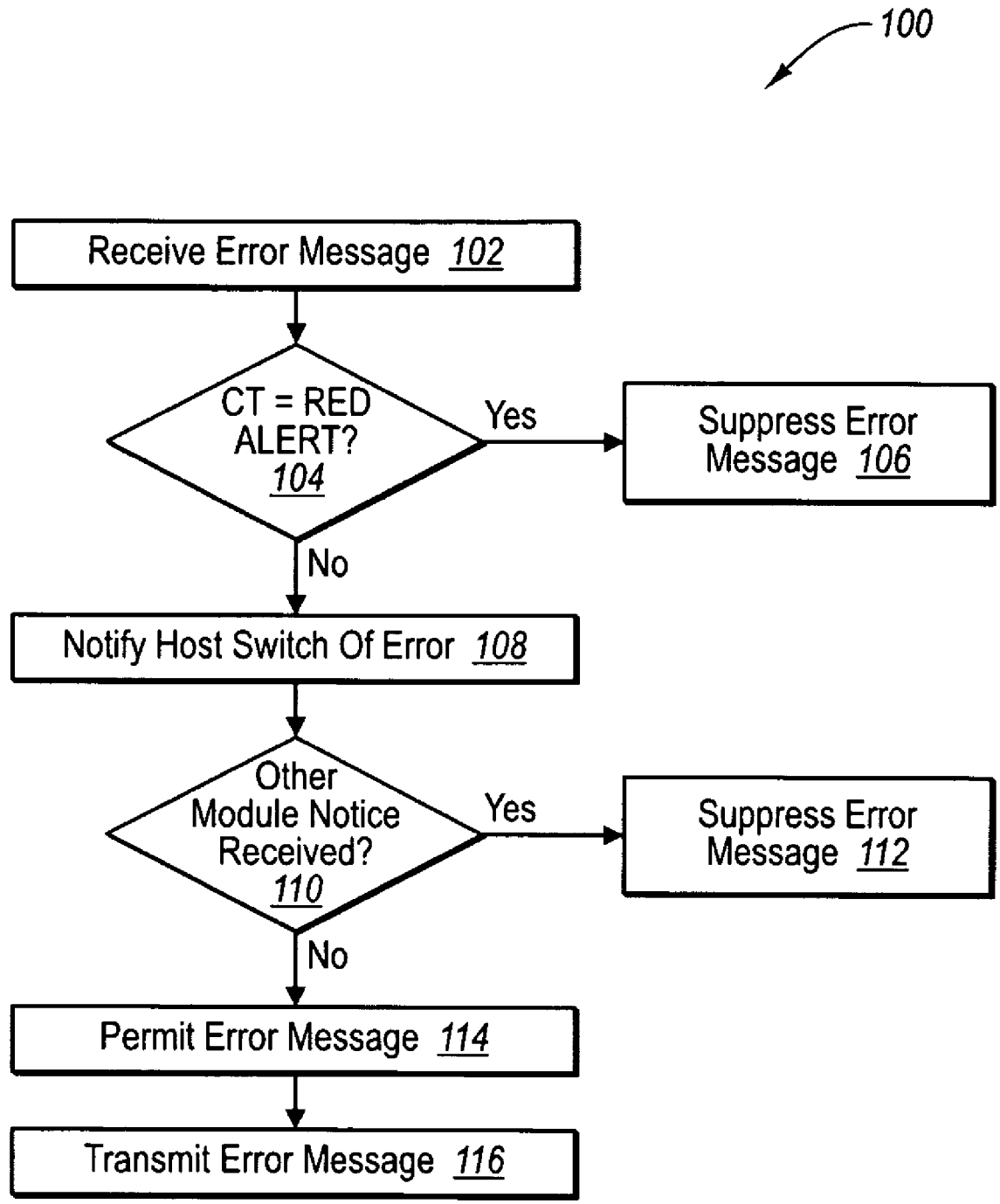
FIG. 7 is a process flow diagram of a method for suppressing error message traffic in accordance with an embodiment of the present invention.

Referring to FIG. 7, in some embodiments a network device 12a-12b may cooperate with a plurality of transceiver modules 14a-14b coupled thereto to control the amount of out-of-band data transmitted across the network fabric according to a method 100. At step 102 a first transceiver module receives an error message from another transceiver module in the fabric. At step 104, the first transceiver module examines the Command Type field of the error message. If the Command Type is a value corresponding to a high priority error, designated here as RED ALERT, then the first transceiver module suppresses any error messages for a wait period at step 106.

If the error message is found not to be a RED ALERT, then the first transceiver module notifies the host network device to which it is immediately coupled that it has an error message to transmit at step 108. At step 110, the host network device evaluates whether other transceiver modules to which it is immediately coupled have provided notice of pending error messages. If so, then the host network device instructs the first transceiver module to suppress the error message at step 112 for a wait period. If not, then the host network device instructs the first transceiver module to transmit the error message at step 114. The first transceiver module then transmits the error message at step 116.

Figure 8:
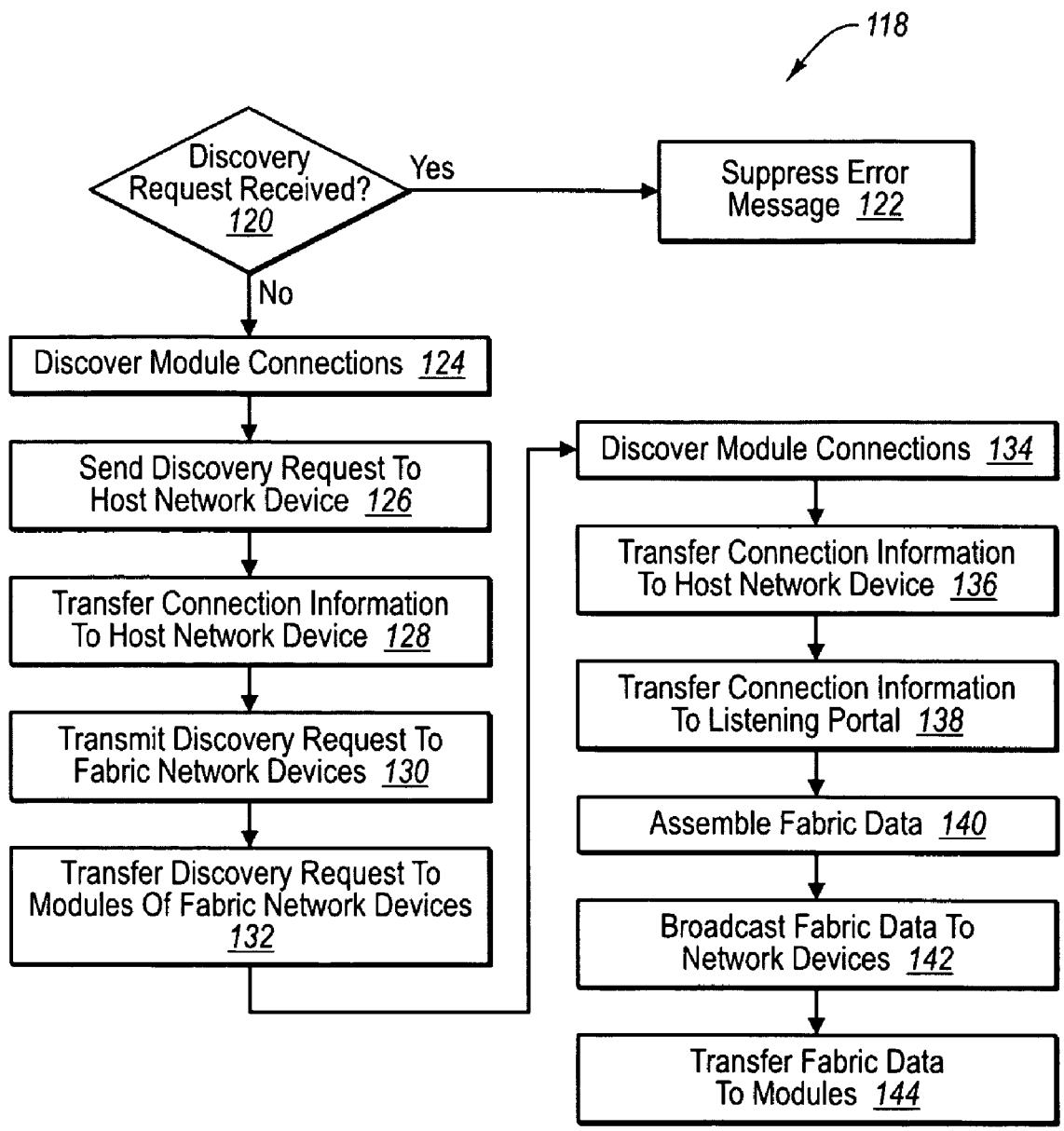
FIG. 8 is a process flow diagram of a method for discovering a network configuration in accordance with an embodiment of the present invention.

Referring to FIG. 8, while referring again to FIG. 4, the host network devices 12a-12f may facilitate discovery of the fabric layout according to a method 118 in order to facilitate out-of-band communication between transceiver modules 14a-14c of different layers. In some embodiments, one of the network devices, such as network device 12a may be designated a listening portal to which fabric layout information will be transmitted.

The method 118 may include evaluating at step 120 at an individual transceiver module whether a discovery request has been received from another transceiver module. If so, then the individual transceiver module may suppress discovery requests indefinitely, or for a wait period, at step 122 in order to avoid generating undue chatter. If a discovery request has not been received, then at step 124, the individual transceiver module will discover modules to which it is connected. Step 124 may include sending Knock Knock messages according to the method of FIG. 5. The individual transceiver module may then evaluate responses to determine which transceiver modules it is connected to. Step 124 may include sending a message instructing other modules to add a wrapper and/or other data to the message and retransmit, such that when a response circulates back to the individual transceiver module over a ring network, for example, it will contain data regarding all intervening modules. Step 124 may include discovery conducted without involvement of any network devices hosting the modules.

At step 126, the individual transceiver module transmits a discovery request to the network device to which it is immediately coupled. At step 128, the individual transceiver module also transmits connection information determined at step 124 to its host network device. At step 130, the host network device transmits a fabric discovery request to other network devices. The request may be transmitted in-band rather than out-of-band. Upon receiving the discovery requests, the other network devices may transmit discovery requests to transceiver modules that they host at step 132. In response to step 132, the transceiver modules will discover out-of-band module connections at step 134, such as by sending Knock Knock messages according to the method of FIG. 5 or as described with respect to step 124 and evaluating responses to determine which transceiver modules it is connected to.

At step 136, the transceiver modules of steps 132 and 134 will transmit the connection information from step 134 to the host network device to which they are immediately coupled. At step 138, the network devices transmit the connection information collected at step 136 to the listening portal. At step 140, the listening portal assembles the information transmitted from the network devices during step 138 into a description of the network fabric. At step 142, the listening portal broadcasts the fabric description to the network devices. Step 142 may include transmitting the data in-band rather than out-of-band. At step 144, each network device may transfer all or part of the fabric description to transceiver modules that it hosts.

Figure 9:
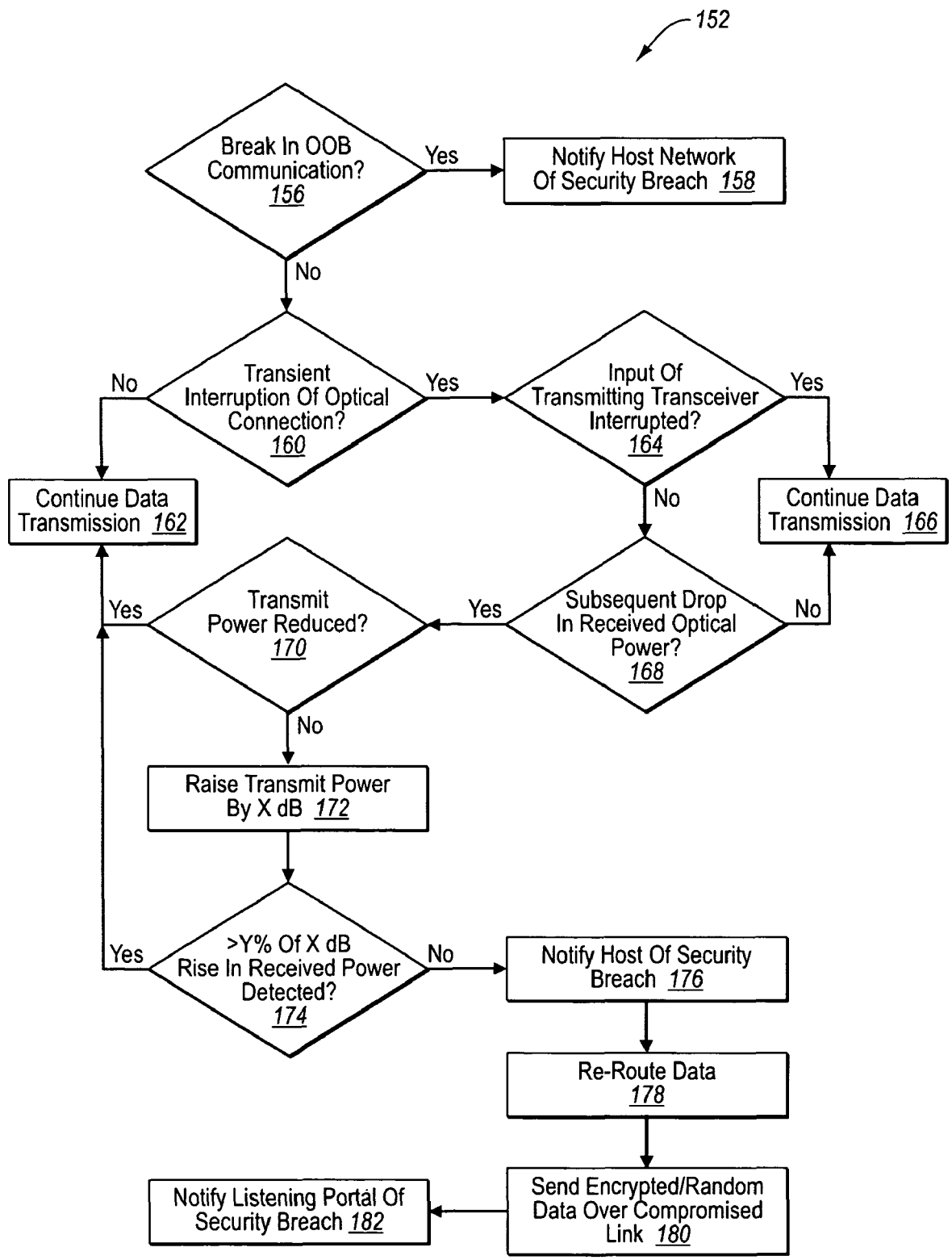
FIG. 9 is a process flow diagram of a method for detecting network intrusions in accordance with an embodiment of the present invention.

Referring to FIG. 9, while also referring to FIG. 4, in some embodiments, communication in an OOB channel 24 may be used to detect unauthorized intrusion in a network. For example, a tap may be placed on an optical link 150 between transceiver module 14c of layer 2 hosted by network device 12c and the transceiver module 14b of layer 3 hosted by network device 12g. Alternatively, one of the modules 14c and 14b coupled to link 150 may be replaced by an unauthorized transceiver.

Accordingly, the method 152 of FIG. 9 may be used to detect the intrusion and reroute data, such as over link 154 between module 14a of layer 2 hosted by network device 12c and module 14b of layer 3 hosted by network device 12e.

At step 156, the method 152 includes evaluating whether a break in communication in the OOB channel has occurred. If so, then one or both of the modules 14c and 14b coupled to link 150 will notify the listening portal 12a of the breach at step 158. Notification may include providing notice to one or both of the network devices 12c and 12g of the breach, which may then provide notice to the listening portal 12a either through the data channel 22 or the OOB channel through one of the other modules hosted by the network devices 12c and 12g.

At step 160, the method includes evaluating whether a transient interruption in the optical connection between a transmitting module and a receiving module has occurred. If not, communication of data continues at step 162. If so, then step 164 includes evaluating whether an input to the transmitting module was interrupted. If so, then transmission continues at step 166. If not, then step 168 includes evaluating whether a drop in received optical power followed the transient interruption. If not, then transmission continues at step 166. If so, then step 170 includes evaluating whether the transmitting module has reduced its transmit power, such as by inquiring over the OOB channel 24 whether a drop has occurred. If so, then transmission of data continues at step 162. If not, then step 172 includes the transmitting module raising its output power by X decibels. At step 174, the receiving module evaluates whether more than Y % of the X decibel increase has been detected. The transmitting module may communicate the value of X to the receiving module by means of the OOB channel 24. The value of Y may be 90, 80, or some other value. If more than Y % of the X decibel increase is detected, than at step 162, data transmission continues. If not, then at step 176, the receiving module notifies its host network device that a security breach has occurred. At step 178, the network device hosting the receiving module takes steps necessary to route data through an alternate link. For example, if link 150 is found to be compromised, data may be routed through link 154 instead. At step 180, the transmitting and receiving module may begin to either encrypt data communicated therebetween or send random data. At step 182 a listening portal may be notified of the security breach by one or both of the network devices hosting the transmitting and receiving modules.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating data between transceiver modules each having a memory defining number of tables each having a size and offset address, the method comprising:
   determining a table and offset address for requested data according to a table size of an originating module;
   generating system address corresponding to the table and offset address;
   transmitting a read command having a command type indicating a system address size, the system address, a length of the requested data, and a contingency field storing the table size of the originating module;
   receiving the read command at a receiving module;
   regenerating the table and offset address from the system address and the table size stored in the contingency field;
   if the table size stored in the contingency field is the same as a table size of the receiving module, transmitting data having the length of the requested data stored at an address corresponding to the table and offset address; and
   if the table size stored in the contingency field is not the same as the table size of the receiving module, transmitting data having a length different from the requested length from a table of the receiving module having a table number corresponding to the regenerated table and offset address.

2. The method of claim 1, further comprising, evaluating whether the receiving module has sufficient memory to return data having the length of requested data beginning at the regenerated table and offset address, and, if not, evaluating an extended contingency field; and, if the extended contingency field does not contain an instruction not to truncate, transmitting to the originating module data beginning at the regenerated table and offset address having a length less than the length of requested data.

3. The method of claim 1, further comprising transmitting to the originating module a table size of the receiving module.

4. The method of claim 1, wherein the originating module and receiving module are hosted by network devices.

5. The method of claim 4, further comprising communicating data provided by the network devices between the originating and receiving modules in an in-band optical channel and communicating the read command in an out-of-band optical channel.

6. The method of claim 5, wherein the out-of-band optical channel comprises modulation of a power envelope of optical signals in the in-band optical channel.

7. The method of claim 1, wherein the requested data is operational parameters of the receiving module.

8. An optical transceiver comprising a receive port, a transmit port, and a processor operably coupled to the receive port, the processor programmed to:
   receive a read command from the receive port, the read command having a command type indicating a system address size, the system address, a length of the requested data, and a contingency field storing a table size of a module that originated the read command;
   regenerate a table and offset address from a system address and a table size stored in a contingency field of the read command;
   transmit data through the transmit port having the length of the requested data stored at an address corresponding to the table and offset address if the table size of the read command is the same as a table size of the optical transceiver module; and
   transmit through the transmit port data having a length different from the requested length from a table of the receiving module having a table number corresponding to the regenerated table and offset address if the table size of the read command is not the same as the table size of the optical transceiver.

9. The optical transceiver of claim 8, wherein the processor is further programmed to:
   evaluate whether the optical transceiver has sufficient memory to return data having the length of requested data beginning at the regenerated table and offset address, and, if not, evaluate an extended contingency field; and,
   transmit to the module that originated the read command beginning at the regenerated table and offset address having a length less than the length of requested data if the extended contingency field does not contain an instruction not to truncate.

10. The optical transceiver of claim 8, wherein the processor is further programmed to transmit through the transmit port the table size of the optical transceiver.

11. The optical transceiver of claim 8, wherein the optical transceiver is hosted by a network device.

12. The optical transceiver of claim 11, wherein the network device is at least one of a switch, router, host bus adapter, and server.

13. The optical transceiver of claim 11, wherein the processor is further programmed to communicate data provided by the network devices through the transmit port in an in-band optical channel.

14. The optical transceiver of claim 13, wherein the processor is programmed to receive the read command through the receive port in an out-of-band optical channel.

15. The optical transceiver of claim 14, wherein the out-of-band optical channel comprises modulation of a power envelope of optical signals in the in-band optical channel.

* * * * *